A. ENOS.
TRAP.
APPLICATION FILED NOV. 21, 1919.

1,342,328.

Patented June 1, 1920.

Witnesses
Benj. Kahn

Inventor
Alexander Enos.
By Victor J. Evans
Attorney

UNITED STATES PATENT OFFICE.

ALEXANDER ENOS, OF ANCHORAGE, TERRITORY OF ALASKA.

TRAP.

1,342,328. Specification of Letters Patent. Patented June 1, 1920.

Application filed November 21, 1919. Serial No. 339,762.

*To all whom it may concern:*

Be it known that I, ALEXANDER ENOS, a citizen of the United States, residing at Anchorage, Territory of Alaska, have invented new and useful Improvements in Traps, of which the following is a specification.

This invention relates to traps and has particular application to a trap designed for catching lynx and other such animals.

To this end the invention makes use of a pair of spring pressed pivoted plates mounted upon a frame, and having their adjacent edges toothed so as to obtain an effective purchase upon the leg of the animal when the plates are depressed against the tension of the springs which normally hold the plates horizontally.

One of the chief characteristics of the invention resides in connecting the said plates with cables or chains utilized to anchor said trap, so that should the animal subsequent to being caught, make an effort to progress with the trap, the anchoring elements would exert a pull upon said plates rendering the latter more effective in their purpose.

The nature and advantages of the invention will be better understood when the following detailed description is taken in connection with the accompanying drawing, the invention residing in the construction, combination and arrangement of parts as claimed.

In the drawing forming part of this specification, like numerals of reference indicate similar parts in the several views and wherein:—

Figure 1:
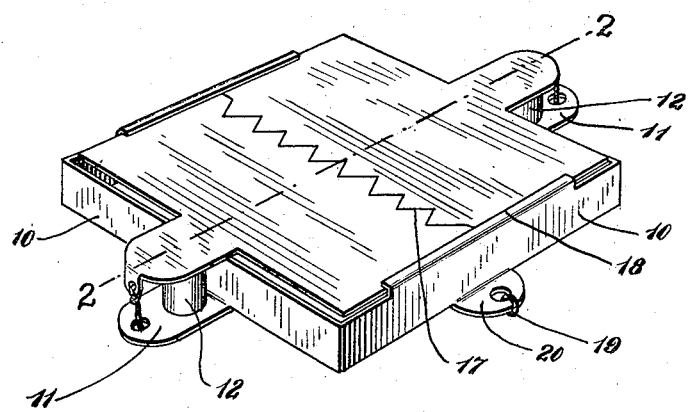
Figure 1 is a perspective view of the trap shown in normal position apart.
Figure 2:
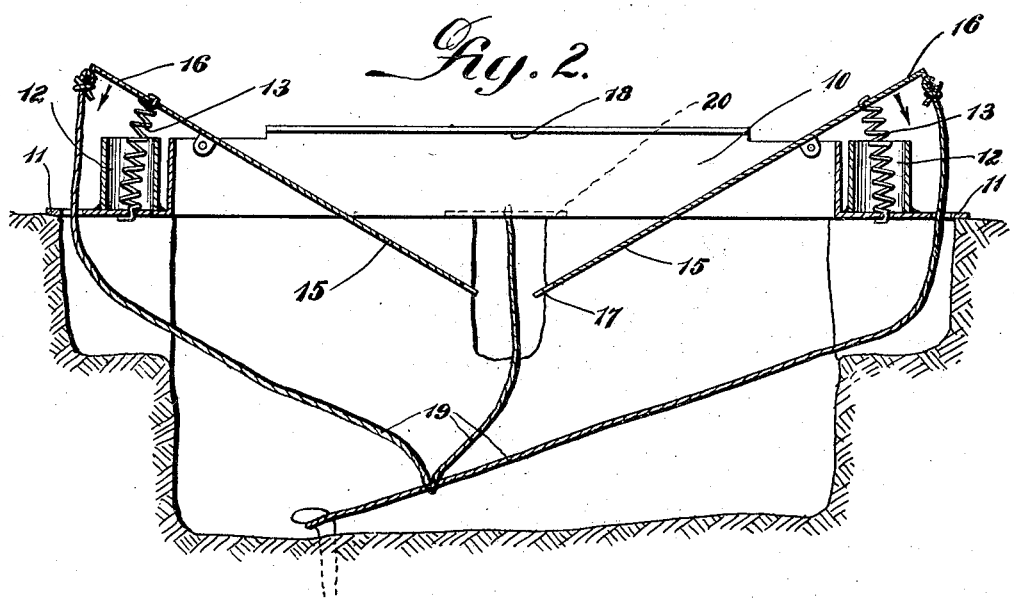
Fig. 2 is a sectional view taken on line 2—2 of Fig. 1 showing the active position of the parts.

Referring to the drawing in detail, 10 indicates a frame of substantially rectangular formation and may be of any suitable material in the proper size. Projecting from the lower edge of the frame and from two opposed sides thereof are extensions 11 upon which are arranged hollow tubular members 12, the latter being provided to house and protect the coiled springs 13 which are arranged within said tubular members and suitably secured to the extensions 11. The purpose of these springs will be hereinafter set forth.

Pivoted between the two remaining sides of the frame are plates 15, each plate being formed with an extension 16 similar to the extensions 11. The extensions 16 overlie the tubular members 12 and are connected with the adjacent ends of the springs 13, the springs operating to normally maintain the plates horizontally disposed and in a plane substantially with the plane of the upper edge of the frame. The plates 15 are pivoted adjacent the sides of the frame from which the extensions 11 project, and are adapted to be moved downwardly within the frame when stepped upon by the animal desired to be caught. The adjacent edges of the plates 15 are provided with teeth 17 so that the plates may obtain an effective purchase upon the leg or body of the animal as will be readily understood. Projecting inwardly from the sides of the frame between which the plates are pivoted are flanges 18 which are disposed to limit the upward movement of the plates under the influence of the springs 13.

In practice, a pit or trap is formed in the ground and the frame 10 supported above the latter. The frame is anchored by means of the flexible elements 19. Two of these elements are terminally secured to lugs 20 projecting from the opposed sides of the frame, while the remaining two elements pass through openings in the extensions 11 and are terminally connected to the extensions 16 of the plates 15. The elements are then brought together at a central point beneath the trap as shown. The trap is then covered with dirt, leaves or the like and consequently hidden from view. When the animal steps upon the trap the plates 15 are depressed, whereupon the leg of the animal slides between the meeting edges of said plates. The leg of the animal is thus effectively gripped through the tendency of the plates to assume their normal position under the influence of the springs 13, and the gripping action of the plates are increased by any effort of the animal to effect a release from the trap. This is particularly true, should the animal attempt to progress with the trap, whereupon a pull is exerted by the anchoring elements 20, and by reason of their connection with the extensions 16 of the plates 15, the latter are rendered more effective for their purpose. The trap is of the self-set and ever-set character.

While I have shown and described what I consider the preferred embodiment of the invention, I desire to have it understood that I do not limit myself to the details herein shown, and that such changes may be resorted to when desired as fall within the scope of what is claimed.

What I claim is:

1. A trap of the character described comprising a frame including spaced parallel sides and ends, a pair of plates pivoted between said sides adjacent the ends of said frame, teeth formed on the adjacent edges of said plates, resilient means associated with said parts and normally holding said plates horizontally, and means for limiting the movement of said plates in one direction under the influence of said resilient means.

2. A trap of the character described comprising a frame having spaced parallel sides and ends, a pair of plates pivoted between the said sides and having their meeting edges toothed, resilient means connected with said plates and holding the latter normally in horizontal position, and flanges projecting upwardly from said sides of the frame to limit the movement of said plates in one direction under the influence of said spring.

3. A trap of the character described comprising a frame having spaced parallel sides and ends, extensions projecting from the lower edges of said ends of the frame, a pair of plates pivoted between the sides of said frame and having their meeting edges toothed, extensions projecting from said plates above and in parallelism with the aforementioned extensions, springs connecting the extensions of the frame with the extensions of said plates whereby the latter are normally held horizontally, and a tubular member for housing said springs and secured to the extensions of said frame.

4. A trap of the character described comprising a frame having spaced parallel sides and ends, plates pivoted between said sides and having their meeting edges toothed, resilient means connecting the frame with said plates and operating to normally hold the latter in horizontal position, means for anchoring said frame to the ground, and said means having connection with said pivoted plates for the purpose specified.

5. A trap of the character described comprising a frame having spaced parallel sides and ends, plates pivoted between said sides and having their adjacent edges toothed, an extension formed on each of said plates, springs connecting the frame and said extensions whereby the plates are normally held in horizontal position, flexible elements for holding the frame to the ground, certain of said elements being connected with said frame, other of said elements being connected with said extensions and means for limiting the movement of said plates.

In testimony whereof I affix my signature.

ALEXANDER ENOS.